United States Patent
Pillai et al.

(10) Patent No.: US 11,257,273 B2
(45) Date of Patent: Feb. 22, 2022

(54) DATA OUTPUT RATE WITH VARIABLE RATE SHADING

(71) Applicant: Advanced Micro Devices, Inc., Santa Clara, CA (US)

(72) Inventors: Pazhani Pillai, Boxborough, MA (US); Skyler Jonathon Saleh, La Jolla, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 49 days.

(21) Appl. No.: 16/720,310

(22) Filed: Dec. 19, 2019

(65) Prior Publication Data

US 2021/0192825 A1 Jun. 24, 2021

(51) Int. Cl.
*G06T 15/00* (2011.01)
*G06T 1/20* (2006.01)
*G06T 1/60* (2006.01)
*G06T 15/50* (2011.01)

(52) U.S. Cl.
CPC ............. *G06T 15/005* (2013.01); *G06T 1/20* (2013.01); *G06T 1/60* (2013.01); *G06T 15/503* (2013.01); *G06T 2210/52* (2013.01)

(58) Field of Classification Search
None
See application file for complete search history.

(56) References Cited

U.S. PATENT DOCUMENTS

| 2019/0172257 | A1* | 6/2019 | Nevraev | G06T 15/80 |
| 2020/0202594 | A1* | 6/2020 | Saleh | G06T 1/60 |
| 2021/0012563 | A1* | 1/2021 | Strugar | G06T 15/005 |

* cited by examiner

*Primary Examiner* — Michael J Cobb
(74) *Attorney, Agent, or Firm* — Volpe Koenig

(57) ABSTRACT

Techniques for processing pixel data are provided. The techniques include, in a first mode in which blending is enabled, reading in render target color data from a memory system; blending the render target color data with one or more fragments received from a pixel shader stage to generate blended color data; outputting the blended color data to the memory system utilizing a first amount of bandwidth; in a second mode in which blending is disabled and variable rate shading is enabled, amplifying shaded coarse fragments received from the pixel shader stage to generate fine fragments; and outputting the fine fragments to the memory system utilizing a second amount of bandwidth that is higher than the first amount of bandwidth.

20 Claims, 8 Drawing Sheets

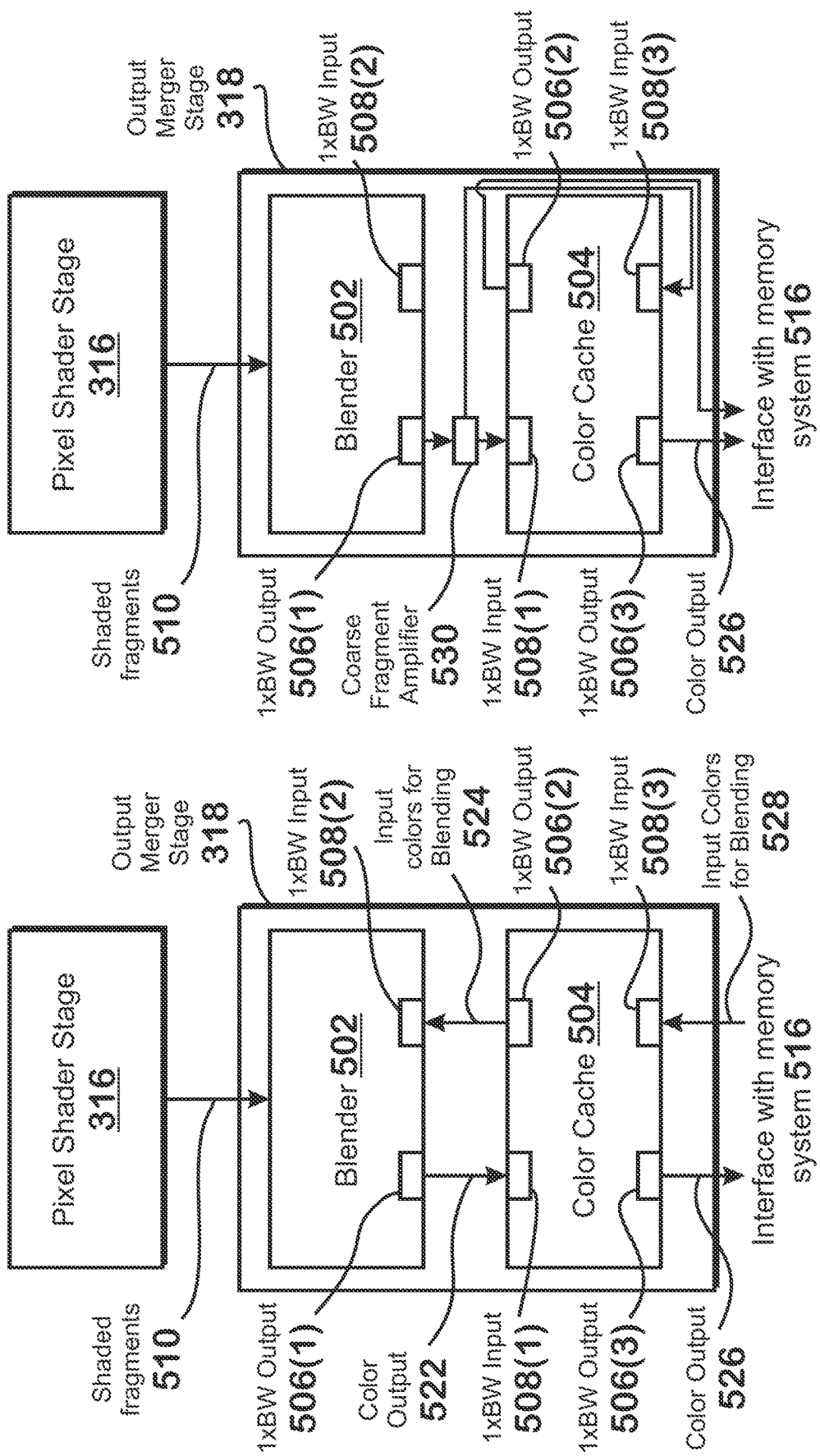

DATA OUTPUT RATE WITH VARIABLE RATE SHADING

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads—a block of 2×2 pixels—and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve efficiency of pixel shading.

BRIEF DESCRIPTION OF THE DRAWINGS

A more detailed understanding can be had from the following description, given by way of example in conjunction with the accompanying drawings wherein:

FIG. 5A illustrates example operations that occur where blending is enabled, including operations related to input and output ports of a blender and a color cache;

FIG. 5B illustrates a technique that increases the rate at which data is written to the render target, according to an example

DETAILED DESCRIPTION

Techniques for processing pixel data are provided. The techniques include, in a first mode in which blending is enabled, reading in render target color data from a memory system; blending the render target color data with one or more fragments received from a pixel shader stage to generate blended color data; outputting the blended color data to the memory system utilizing a first amount of bandwidth; in a second mode in which blending is disabled and variable rate shading is enabled, amplifying shaded coarse fragments received from the pixel shader stage to generate fine fragments; and outputting the fine fragments to the memory system utilizing a second amount of bandwidth that is higher than the first amount of bandwidth.

Figure 1:
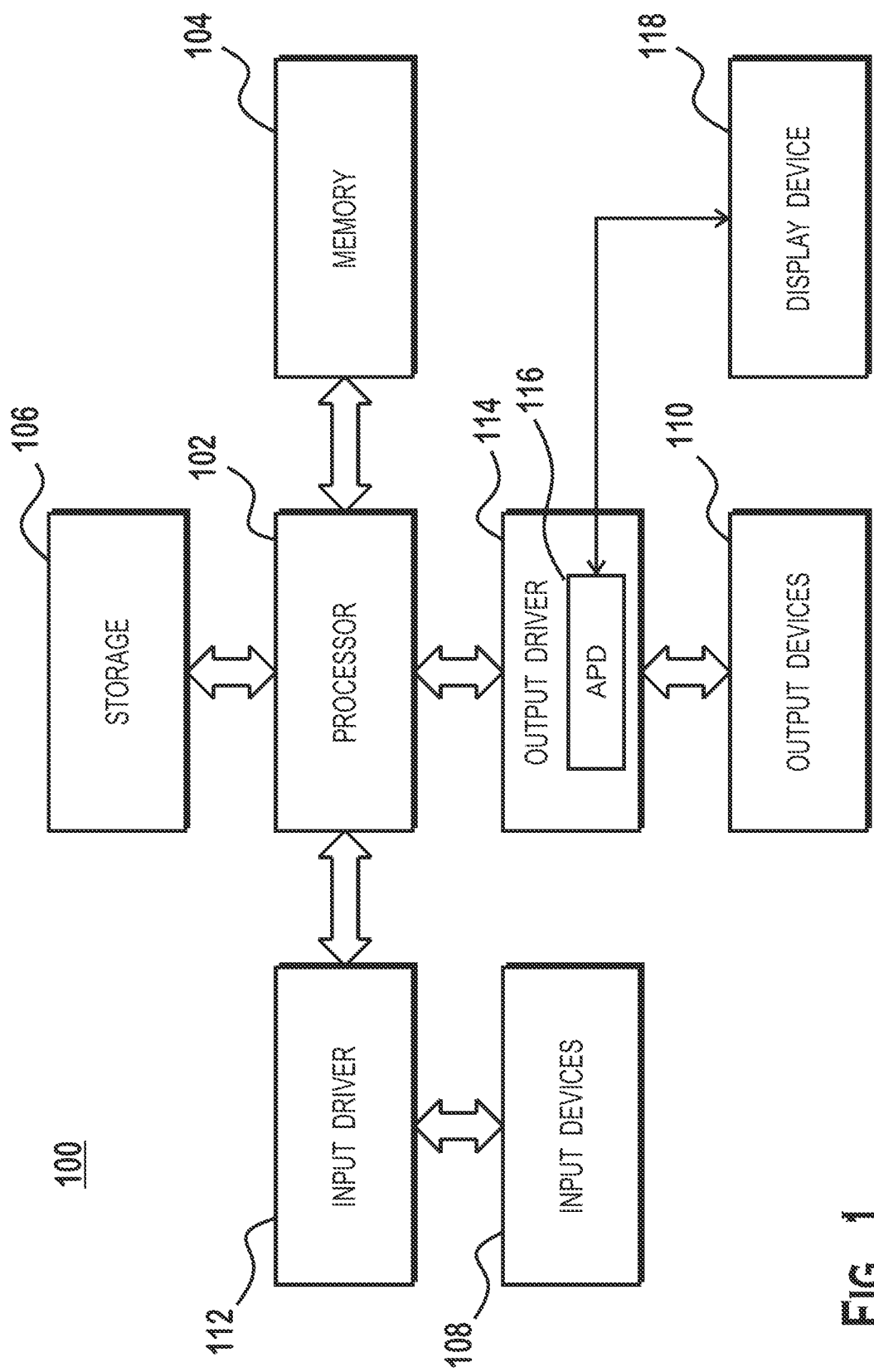
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
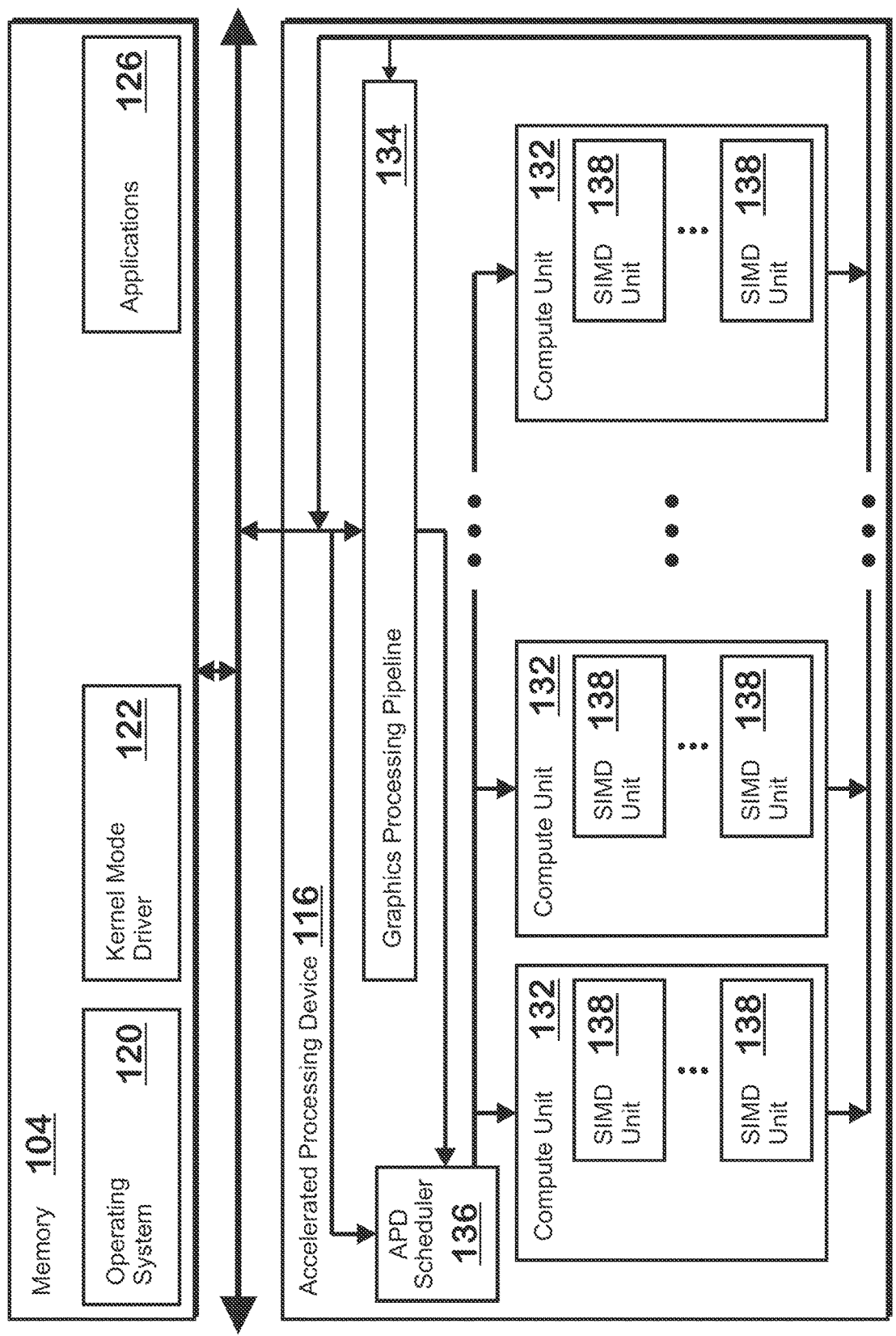
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
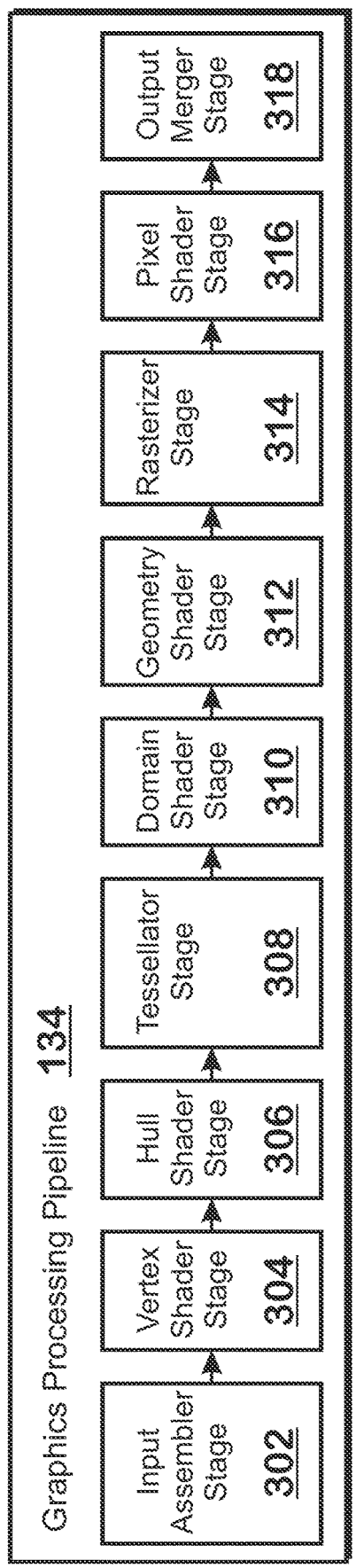
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In one mode of operation, the rasterization performed by the rasterizer stage 314 is done at the same resolution as pixel shading performed by the pixel shader stage 316. By way of more detailed background than the description provided above, the rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written).

Typically, the fragments are grouped into quads, each quad including fragments corresponding to four neighboring pixel locations (that is, 2×2 fragments). Scan conversion of a triangle involves generating a fragment for each pixel location covered by the triangle. If the render target is a multi-sample image, then each pixel has multiple sample locations, each of which is tested for coverage. The fragment records coverage data for the samples within the pixel area that are covered by the triangle. The fragments that are generated by the rasterizer stage 314 are transmitted to the pixel shader stage 316, which determines color values for those fragments, and may determine other values as well.

Performing rasterization and pixel shading at the same resolution means that for each fragment generated by the rasterizer, the pixel shader 316 performs a calculation to determine a color for that fragment. In other words, the area of screen-space occupied by a pixel is the same area as the precision with which colors are determined. In one example, in the SIMD-based hardware of the compute units 132, each fragment generated by the rasterizer stage 314 is shaded by a different work-item. Thus, there is a one-to-one correspondence between generated fragments and work-items spawned to shade those fragments. Note that the rasterizer stage 314 typically performs depth testing, culling fragments occluded by previously-rendered fragments. Thus, there is a one-to-one correspondence between fragments that survive this depth culling and work-items spawned to color those surviving fragments. Another way to understand the mode of operation in which rasterization is performed at the same resolution as shading is that the resolution at which the edges of a triangle can be defined is equivalent to the resolution at which colors of that triangle can be defined.

One issue with the above mode of operation, in which rasterization occurs at the same resolution as pixel shading occurs for triangles that have a fixed color or low frequency change in color. For such triangles, pixel shading operations on nearby fragments produce the same or similar color and are effectively redundant. A similar result could therefore be performed with a much smaller number of pixel shader operations. Thus, it is advantageous to decouple the rasterization resolution from the shading resolution, and a technique for allowing rasterization to occur at a different resolution than pixel shading is provided below. The advantage of such a technique is a reduction in the number of pixel shader operations being performed, which reduces processing load and improves performance.

Figure 4:
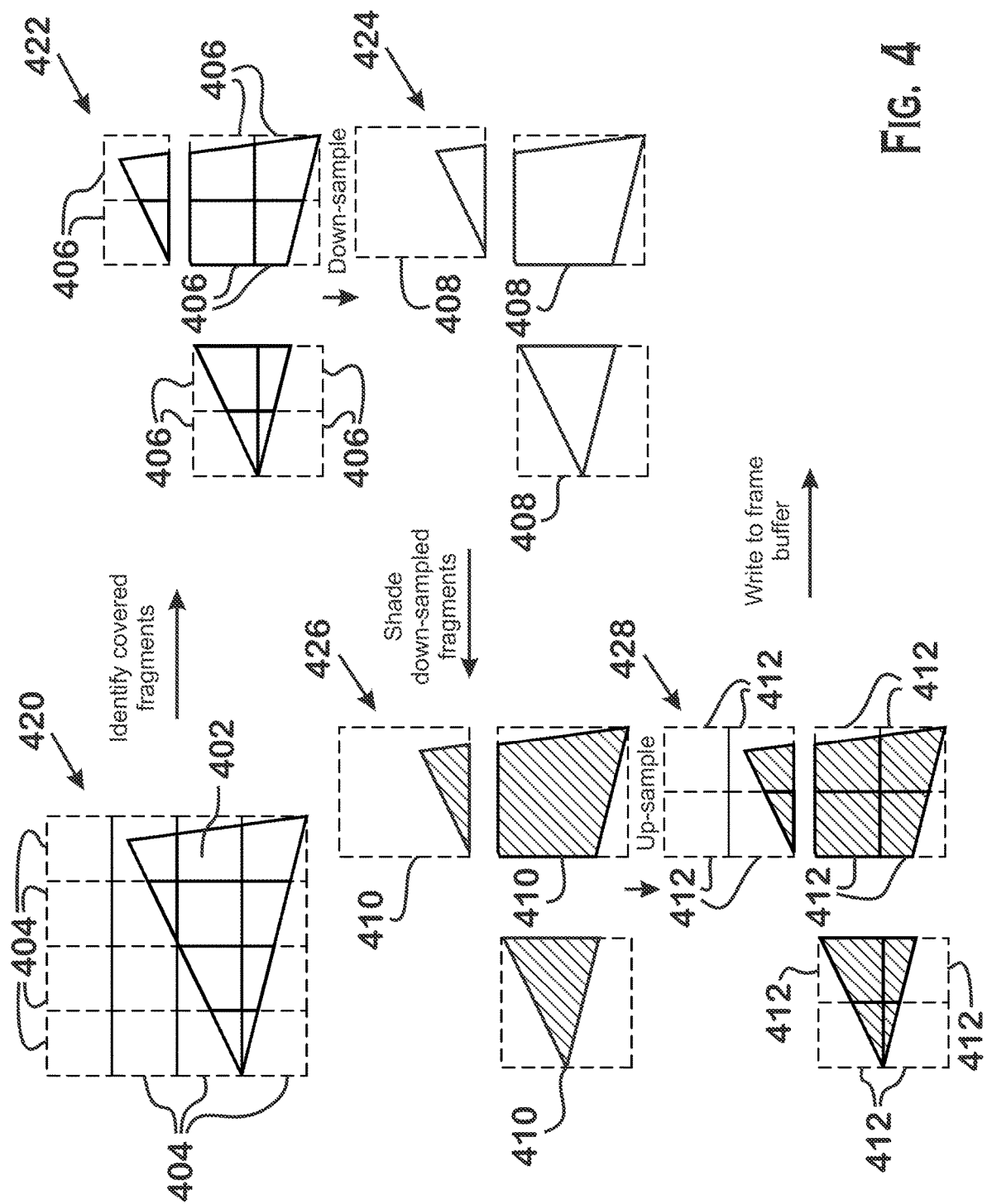
FIG. 4 illustrates operations for a variable rate shading technique, according to an example.

FIG. 4 illustrates a variable rate shading ("VRS") technique according to an example. At state 420, the rasterizer stage 314 receives a triangle 402 having vertices that define positions with respect to screen pixels 404. At state 422, the rasterizer stage 314 identifies fragments 406 covered by the triangle 402. A fragment 406 is a data item corresponding to a screen pixel 404 that indicates that at least one sample position within that screen pixel 404 is covered by a triangle 402. In state 422, each of the fragments 406 illustrated has at least one sample position covered by triangle 402. A "screen pixel" is an area of a render target (portion of memory to which pipeline output is written) for which rendering output is written. A render target includes multiple pixels, each of which includes data such as color data and potentially other data. Although the term "screen pixel" is used, it should be understood that this term sometimes means a pixel of any render target, and not necessarily a render target that is output for display on a screen.

At state 424, the rasterizer stage 314 down-samples the covered fragments 406 illustrated at state 422. Down-sampling involves creating coarse fragments 408 that each correspond to at least one covered fine fragment 406 (where fragments 406 are called fine fragments as the fragments 406 cover a smaller screen area than the coarse fragments). The coarse fragments are created so that when shading occurs by the pixel shader stage 316, the amount of shading that needs to occur is reduced. Thus at state 426, the pixel shader stage 316 shades the coarse fragments to generate shaded coarse fragments 410. At state 428, the output merger stage 318 up-samples the shaded coarse fragments 410 to generate up-sampled (or "fine") fragments 412. Up-sampling involves generating multiple up-sampled fragments 412 from one or more coarse fragments 410, where each up-sampled fragment 412 has the same color as the color generated for the corresponding coarse fragment 410 and falls within the render target area defined for the coarse fragment. The output merger stage 318 then writes the up-sampled fragments 412 to the render target surface.

It should be noted that although the variable rate shading technique of FIG. 4 reduces the amount of work performed by the pixel shader 316, other steps are beneficially used to improve the performance of the output merger stage 318.

FIGS. 5A and 5B illustrates a portion of the graphics processing pipeline 300, including the pixel shader stage 316 and details of the output merger stage 318, according to an example. The examples of FIGS. 5A and 5B illustrate the operations for transmission of data between these units for the purpose of writing the data to a color cache 504 and eventually out to the memory system.

The color cache 504 is a cache of the output merger stage 318 that caches pixel color values written by the graphics pipeline 300 and for writing out to a more general memory system such as an on-chip memory of the APD 116 or the system memory 104 (sometimes referred to as the "memory fabric" herein). In typical operation, the color cache 504 stores at least a portion of the render target, reading in data and writing back data to a higher level portion of the memory hierarchy. The "render target" is the portion of memory to which the final output of the graphics processing pipeline 300 is written. The render target can be the frame buffer, from which data is typically read out to a screen or can be a different surface used for a different purpose than immediate output to a screen.

The blender 502 operates in a blending mode and a pass-through mode. In the blending mode, the blender 502 combines the colors from received shaded fragments 510 with colors already in the render target. In an example, the blender 502 receives a shaded fragment 510, identifies a pixel of the render target having the same screen position as the received shaded fragment, combines the color of the received shaded fragment with the color of the identified pixel in the render target, and writes the resulting combined color to the render target through the color cache 504.

In the pass-through mode, blending is not enabled. In this mode, because blending is not enabled, the blender 502 does not perform the blending operations described above. Instead, the blender 502 passes the shaded fragments 510 to the color cache 504 to overwrite corresponding colors of the render target. In an example, the blender 502 receives a shaded fragment having a screen position. In response, the blender 502 performs a write of the shaded fragment to the color cache 504 at the memory address corresponding to the screen position. If the color cache 504 already stores the data at that memory address, then the color cache 504 simply writes the color of the received fragment to the appropriate memory location. If the color cache 504 does not store the data at the memory address, then the color cache 504 fetches the appropriate data via the interface with the memory system 516, and applies the write of the received shaded fragment to that data. The color cache 504 at various points in time writes data back out to the rest of the memory hierarchy via the interface with the memory system 516. The color cache 504 and the blender are implemented as hardware circuitry that performs the operations described herein.

FIG. 5A illustrates example operations that occur where blending is enabled, including operations related to input and output ports of the blender 502 and color cache 504. The pixel shader stage 316 generates shaded fragments 510 and outputs those fragments to the output merger stage 318. The output merger stage includes a one-multiple bandwidth output 506(1) and a one-multiple bandwidth input 508(2). "One-multiple bandwidth" (shown as "1×BW" in FIGS. 5A and 5B) refers to a particular amount of bandwidth. If two one-multiple bandwidth communication channels are used together to transmit data, then it is possible to transmit that data at twice the bandwidth of the data on a one-multiple bandwidth channel.

The color cache 504 includes a one-multiple bandwidth input 508(1) coupled to a one-multiple bandwidth output 506(1) of the blender 502. The color cache 504 also includes a one-multiple bandwidth output 506(2) coupled to a one-multiple bandwidth input 508(2) of the blender 502. To blend inputted shaded fragments 510 with colors in the render target, the blender inputs colors (input colors 524) from the color cache 504 via the one-multiple bandwidth output 506(2) of the color cache 504 and the one-multiple bandwidth input 508(2) of the blender 502. The blender 502 blends the color read in from the color cache 504 with the received fragment and outputs the combined color (as color output 522) via the one-multiple bandwidth output 506(1) of the blender 502 and the one-multiple bandwidth input 508(1) of the color cache 504 to the color cache 504.

The color cache 504 also reads in input colors for blending 528 via a one-multiple bandwidth input 508(3) from the memory system and outputs (e.g., performs cache write-backs) color outputs 526 to the memory system via the one-multiple bandwidth output 506(3).

Although the above description describes a data flow for a single pixel within the blender 502, color cache 504, and memory system, it should be understood that data traffic for different pixels occur in parallel, between the different outputs 506 and inputs 508 for different pixels, and that this data traffic occurs at a data transfer rate defined by the bandwidth of the one-multiple bandwidth inputs and outputs, for each connection between an input 508 and an output 506. For example, in a single clock cycle, it is possible to be outputting color output 522 for certain pixels, inputting color input for blending 524 for other pixels, reading in input colors 528 to the color cache 504 for still other pixels, and outputting yet other color output pixels 526 from the color cache 504 to the memory system. Moreover, each such transaction occurs at the bandwidth of the corresponding input/output connection.

In the pass-through mode, the input colors for blending are not read into the color cache 504 and are not read into the blender 502. Instead, the pixel shader stage 316 passes the shaded fragments 510 to the blender 502, which outputs those fragments to the color cache to be written.

Variable rate shading, described above, increases the rate at which fragments are shaded by down-sampling fragments to generate coarse fragments, shading the coarse fragments, up-sampling the shaded coarse fragments to generate shaded fine fragments, and writing the shaded fine fragments to the render target through the color cache 504. However, there is an opportunity to further increase the overall throughput of the graphics processing pipeline 300. More specifically, using only the path for the color output 522 to transmit fragments from the blender 502 to the color cache 504 could act as a bottleneck to the throughput increase afforded by the VRS technique.

For these reasons, a technique is illustrated in FIG. 5B that increases the rate at which data is written to the render target. The technique occurs where blending is disabled and repurposes the bandwidth that would be used to read data from the render target into the color cache 504 and blender 502 for the purpose of blending to instead write data out to the color cache 504 and the memory system. This repurposing increase the rate at which the fragments are written out to the render target, which reduces or eliminates the bottlenecking effect described above.

In greater detail, in FIG. 5B, a coarse fragment amplifier 530 is illustrated. The coarse fragment amplifier is hardware circuitry that "amplifies" the shaded coarse fragments produced using VRS. More specifically, as described above, the coarse fragments correspond to an area of multiple render target pixels. Thus the coarse fragment amplifier 530 converts ("amplifies") each coarse fragment to multiple fine fragments. The coarse fragment amplifier 530 outputs some of these fine fragments to the one-multiple bandwidth input 508(1) of the color cache 504 and outputs some of these fine fragments to another one-multiple bandwidth input 508(3) of the color cache 504. The one-multiple bandwidth inputs 508(3) is the input used by the color cache 504 to read in input colors for blending 528 when blending is enabled. Since blending is disabled in FIG. 5B, this input 508(3) is repurposed for outputting the fine fragments, thereby at least partially alleviating the bottleneck described above.

In addition, the color cache 504 performs cache write-backs using both the one-multiple bandwidth output 506(3) as well as the one-multiple bandwidth output 506(2). The one-multiple bandwidth output 506(2) is used to output the input colors for blending 524 to the blender 502 when blending is enabled. Thus this bandwidth for blending is also repurposed to output data from the color cache 504 to the memory system when blending is disabled and VRS is enabled.

Figure 6A:
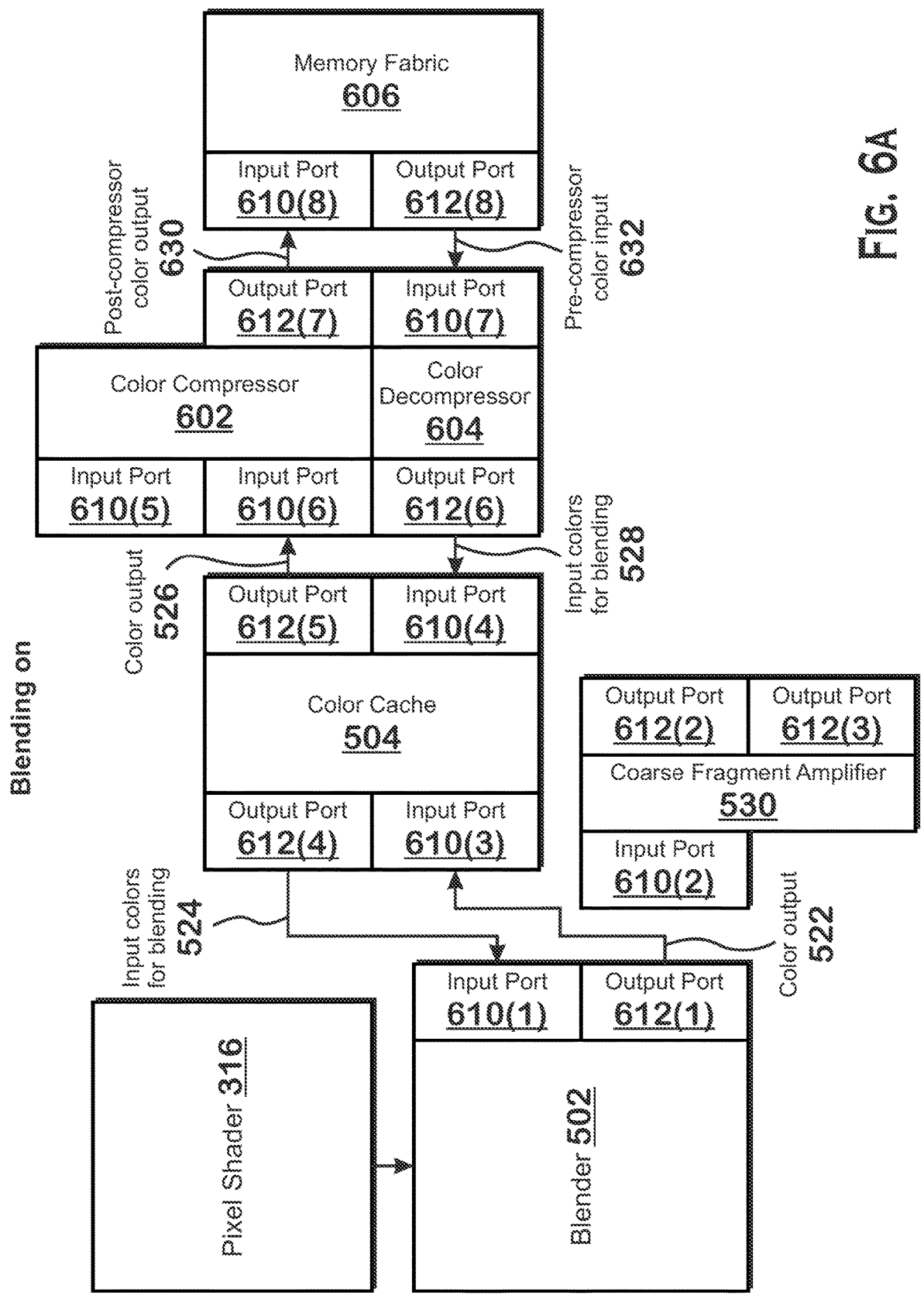
FIGS. 6A and 6B illustrate additional example configurations for a portion of the graphics processing pipeline that outputs fragments to the render target.
Figure 6B:
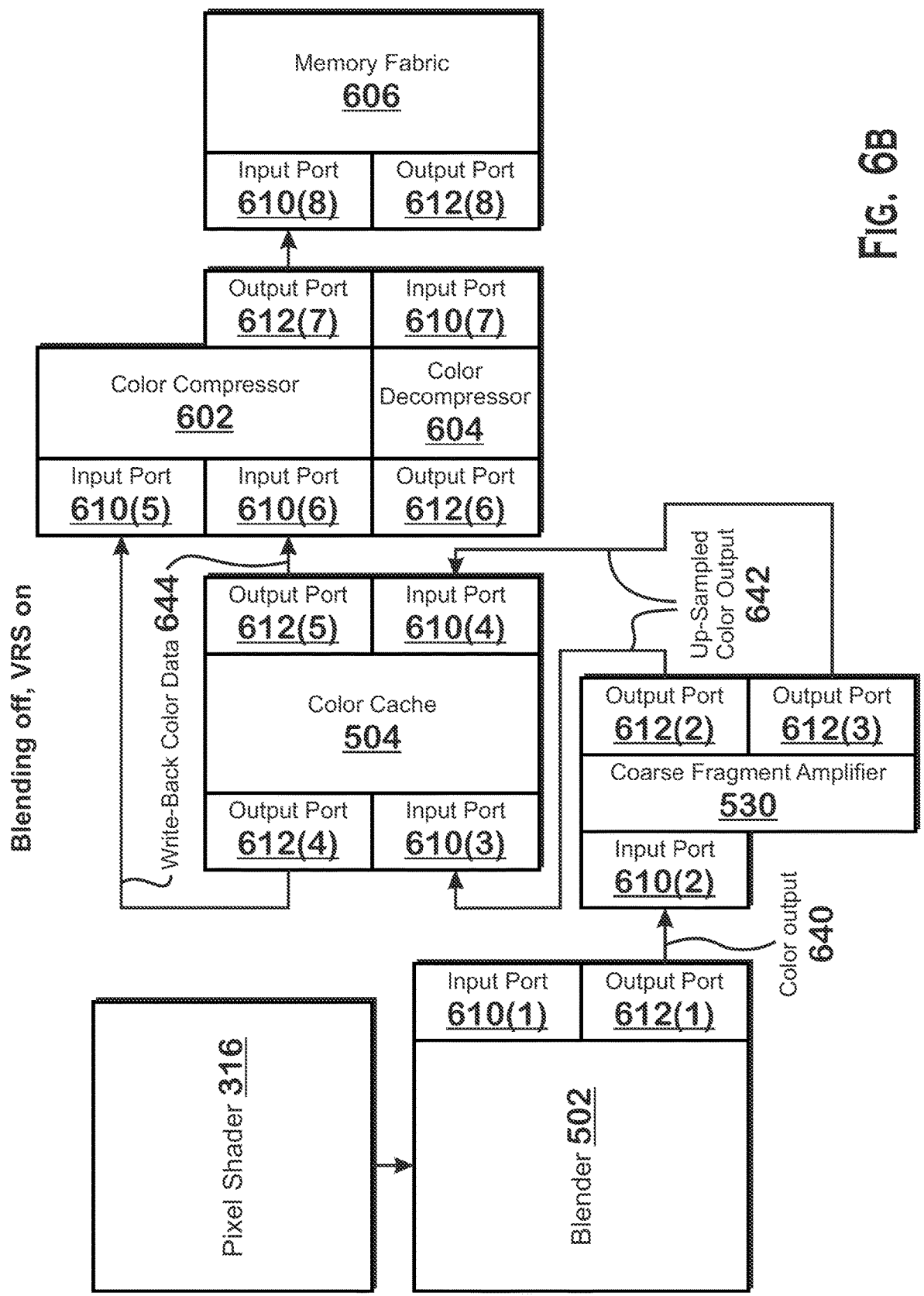

FIGS. 6A and 6B illustrate additional example configurations for a portion of the graphics processing pipeline 300 that outputs fragments to the render target. FIG. 6A illustrates a configuration in which blending is on and FIG. 6B illustrates a configuration in which blending is off and VRS is on. In both figures, the pixel shader 316, blender 502, color cache 504, and coarse fragment amplifier 530 are similar to those illustrated in FIGS. 5A and 5B. A color compressor 602 and color decompressor 604 are also included and a memory fabric 606 is illustrated explicitly. Each element shown is embodied as hardware circuitry configured to perform the described operations.

The color compressor 602 compresses pixel color data for storage in the memory system and the color decompressor 604 decompresses pixel color data for being written to the color cache 504. The memory fabric 606 represents the conduit between the color compressor 602 and color decompressor 604 and the rest of the memory hierarchy. The blender 502 includes an input port 610(1) and an output port 612(1). The input port 610(1) is coupled to an output port 612(4) of the color cache 504. The output port 612(1) of the blender 502 is coupled to an input port 610(3) of the color cache 504. The output port 612(5) of the color cache 504 is coupled to an input port 610(6) of the color compressor 602. The input port of the color cache 504 is coupled to the output port 612(6) of the color decompressor 604. The output port 612(7) of the color compressor 602 is coupled to the input port 610(8) of the memory fabric 606 and the input port 610(7) of the color decompressor 604 is coupled to the output port 612(8) of the memory fabric 606. A coarse fragment amplifier 530, with an input port 610(2), an output port 612(2), and an output port 612(3) is shown but is bypassed in the situation that blending is on, as in FIG. 6A. Each input port 610 and output port 612 has a certain amount of bandwidth that, in some situations, serves as a bottleneck on the operation of the graphics processing pipeline 300. Each element shown is embodied as hardware circuitry configured to perform the described operations.

In operation, the pixel shader 316 generates fragments and transmits the fragments to the blender 502. The blender 502 reads in pixel color values 524 via input port 610(1) and output port 612(4), blends the fragments with corresponding colors of the render target, and outputs the blended color output 522 to the color cache 504 via the output port 612(1), and the input port 610(3). The color cache 504 inputs colors for blending 528 from the memory fabric 606 via the color decompressor 604 and via the input port 610(4), output port 612(6), input port 610(7), and output port 612(8). More specifically, the color decompressor 604 inputs pre-compressor color input 632 from the memory fabric 606 via output port 612(8) and input port 610(7), decompresses the color input, and outputs the decompressed colors to the color cache 504 as input colors for blending 528 via the output port 612(6) and the input port 610(4). The color cache 504 writes color output 526 to the color compressor 602 via the output port 612(5) and the input port 610(6). The color compressor 602 compresses the color values and writes the color values to the memory fabric 606 via the output port 612(7) and the input port 610(8) as post-compressor color output 630. As with FIGS. 5A and 5B, each coupling between input port 610 and output port 612 has an associated bandwidth, and communication can occur across different couplings in parallel.

In FIG. 6B, blending is off and VRS is enabled. In this situation, the coarse fragment amplifier 530 is used to convert the coarse fragments to fine fragments as described elsewhere herein. The coarse pixel amplifier 530 has one input port 610(2) and two output ports 612, and thus outputs fragments at a higher rate than the coarse fragment amplifier 530 inputs fragments. For this reason, the coarse fragment amplifier 530 outputs to two different input ports 610 of the color cache. One of these input ports 610(3) receives color output 522 from the blender 502 when blending is enabled. Another of these input ports 610(4) receives input colors for blending 528 from the color decompressor 604 when blending is enabled, but is available in the configuration of FIG. 6B because blending is not enabled. Thus, when blending is not enabled, the coarse fragment amplifier outputs up-sampled output colors 642 from output port 612(2) to input port 610(3) of the color cache 504 and outputs up-sampled output colors 642 from output port 612(3) to input port 610(4) of the color cache 504.

The color cache 504 outputs write-back color data 644 to input port 610(5) and input port 610(6) of the color compressor 602 via the output port 612(4) and the output port 612(5). Note that one of these output ports 612 is used to write data to the blender 502 for blending operations but is repurposed to output the extra color data to the color compressor 602 when blending is off and VRS is on. The color compressor 602 compresses the data and writes the data to the memory fabric 606 via output port 612(7) and input port 610(8).

It should be understood that each of the inputs (input ports 610 and inputs 508) and outputs (output ports 612 and outputs 506) represent physical circuits that, by virtue of physical characteristics and operating parameters (e.g., clock speed) operate at a specific bandwidth (number of bits transferred per unit of time).

Figure 7:
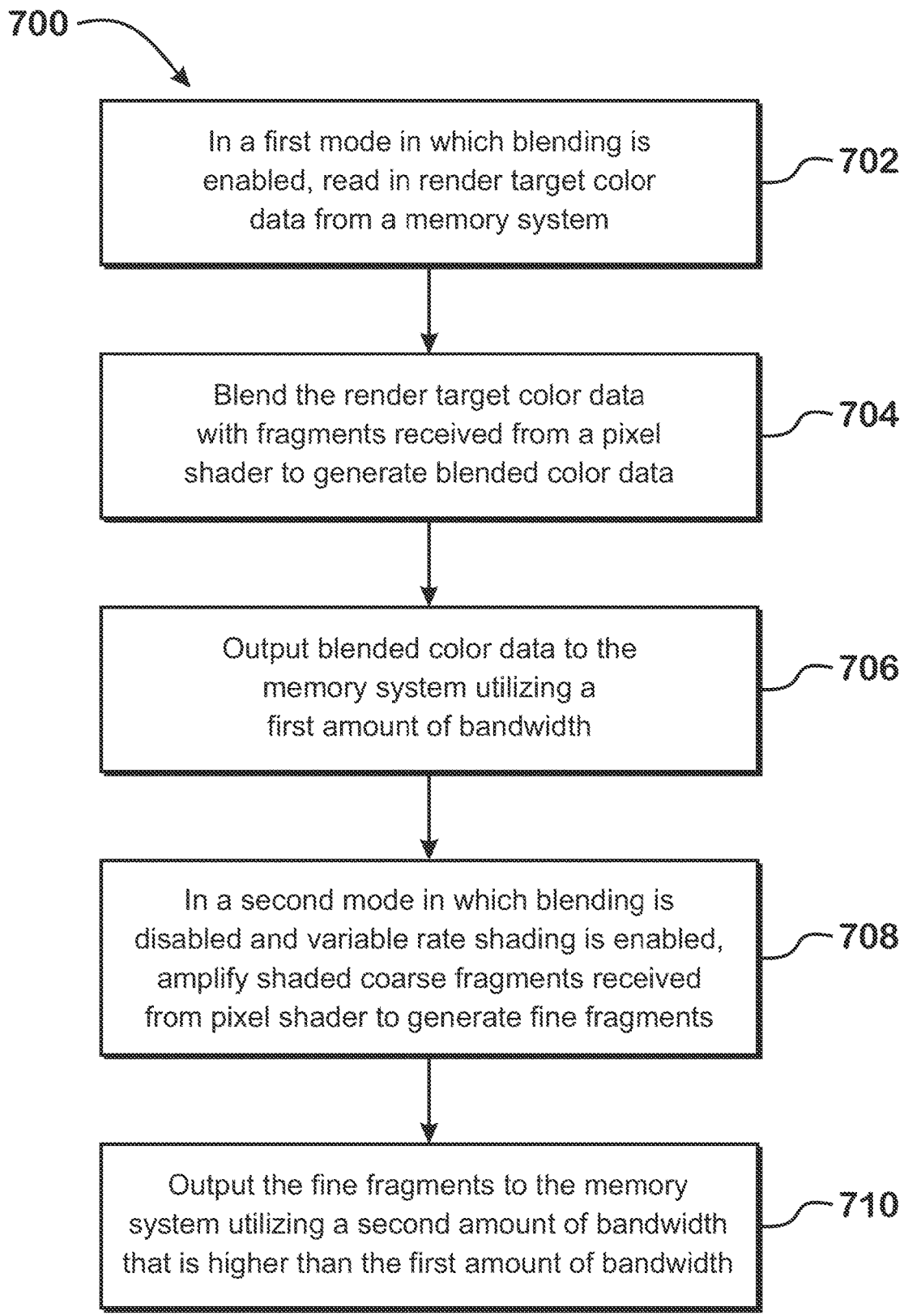
FIG. 7 is a flow diagram of a method for repurposing bandwidth utilized for color blending as bandwidth utilized to output fragments generated utilizing a variable rate shading technique, according to an example.

FIG. 7 is a flow diagram of a method 700 for repurposing bandwidth utilized for color blending as bandwidth utilized to output fragments generated utilizing a variable rate shading technique, according to an example. Although described with respect to the system of FIGS. 1-6B, those of skill in the art will recognize that any system, configured to perform the steps of the method 700 in any technically feasible order, falls within the scope of the present disclosure.

At step 702, in a first mode in which blending is enabled, the blender 502 reads in render target color data from a memory system. In the system illustrated in FIGS. 1-6B, this read occurs to the color cache 504, which reads colors from the render target from memories higher in the memory hierarchy (e.g., higher level caches and other memories such as system memory). In the system of FIGS. 6A-6B, the read occurs to the color cache 504, through a color decompressor 604, and to the memory fabric 606.

In some examples, the read-in occurs through a coupling between input and output ports that supports a particular amount of bandwidth. In some examples, this bandwidth is between an input port and an output port on the blender 502 and the color cache 504, respectively. In some examples, the read-in also occurs with the particular amount of bandwidth between an input port and an output port on the color cache 504 and a color decompressor 604, respectively.

At step 704, the blender 502 blends the render target color data with fragments received from a pixel shader 316 to generate blended color data. In various examples, any technically feasible blending technique is used. At step 706, the blender 502 outputs the blended color data to the memory system utilizing a channel with a particular amount of bandwidth. In some implementations, the bandwidth referred to at step 702 is the same as the bandwidth referred to at step 706.

At step 708, in a second mode in which blending is disabled and variable rate shading is enabled, a coarse fragment amplifier 530 amplifies shaded coarse fragments received from the pixel shader 316 to generate fine fragments. At step 710, the coarse fragment amplifier 530 outputs the fine fragments to a memory system over a channel that has a second amount of bandwidth that is higher than the amount of bandwidth utilized to output blended color data, referred to at steps 702 and 706.

In some implementations, the amplification of step 708 occurs by outputting, from the blender 502, which serves as a pass-through when blending is off, coarse fragments, to a coarse fragment amplifier 530. The coarse fragment amplifier 530 then amplifies the coarse fragments to generate fine fragments. The number of fine fragments generated is greater than the number of coarse fragments from which the fine fragments are generated. In some implementations, the coarse fragments are output from the blender 502 to the coarse fragment amplifier 530 via a communication channel between an output of the blender 502 and an input of the coarse fragment amplifier 530, where the communication channel has a certain amount of bandwidth. In some implementations, this amount of bandwidth is the same as the amount of bandwidth as the amount of bandwidth for the channel from the blender 502 to the color cache 504 when blending is on.

In some implementations, the coarse fragment amplifier 530 amplifies the coarse pixels to generate the fine pixels and outputs the fine pixels using a channel that has a greater bandwidth than the bandwidth of the channel from the blender 502 to the coarse fragment amplifier 530. In some implementations, the additional bandwidth is provided by coupling one of the outputs of the coarse fragment amplifier 530 to an input of the color cache 504 that receives input colors for blending from the memory system (which, in some implementations, occurs through a color decompressor 604) when blending is on. In some implementations, the color cache 504 outputs pixel colors for write-back to a memory system using a channel that has more bandwidth than the bandwidth of the channel for outputting fragments or reading in color data between the blender 502 and the color cache 504. In some implementations, this increased bandwidth is utilized by repurposing an output of the color cache 504 that provides input colors for blending to the blender 502 when blending is enabled to output the write-back pixel colors to the memory system. In some implementations, the color cache 504 outputs the write-back colors to a color compressor 602 via two input ports, which compresses the write-back colors to form compressed colors and writes those compressed colors to the memory fabric 606.

Each of the units illustrated in the figures represent hardware circuitry configured to perform the operations described herein, and certain units of the graphics processing pipeline 300 are programmable and can thus execute programs.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing pixel data, the method comprising:
   in a first mode in which blending is enabled, reading in render target color data from a memory system;
   blending the render target color data with one or more fragments received from a pixel shader stage to generate blended color data;
   outputting the blended color data to the memory system utilizing a first amount of bandwidth;
   in a second mode in which blending is disabled and variable rate shading is enabled, converting shaded coarse fragments received from the pixel shader stage into fine fragments; and
   outputting the fine fragments to the memory system utilizing a second amount of bandwidth that is higher than the first amount of bandwidth.

2. The method of claim 1, wherein the memory system includes a color cache.

3. The method of claim 2, wherein outputting the blended color data to the memory system utilizing the first amount of bandwidth comprises:
   outputting the blended color data to the color cache via a first communication channel between a first output of a blender and a first input of the color cache, wherein the first communication channel has the first amount of bandwidth.

4. The method of claim 3, further comprising:
outputting write-back data from the color cache to a memory fabric utilizing a second communication channel that has a third amount of bandwidth that is greater than the first amount of bandwidth.

5. The method of claim 4, wherein the second communication channel comprises:
a first communication sub-channel that includes a second output of the color cache and a third output of the color cache, wherein in the first mode, the second output of the color cache is utilized to provide the render target color data to the blender and in the first mode, the third output of the color cache is utilized to output write-back data.

6. The method of claim 5, wherein each of the second output and the third output has the first amount of bandwidth.

7. The method of claim 2, further comprising:
outputting shaded coarse fragments to a coarse fragment amplifier via a first communication channel having the first amount of bandwidth.

8. The method of claim 7, wherein outputting the fine fragments to the memory system includes:
outputting the fine fragments to the color cache via a first communication sub-channel that includes a first output of the coarse fragment amplifier and a first input of the color cache and a second communication sub-channel that includes a second output of the coarse fragment amplifier and a second input of the color cache.

9. The method of claim 8, wherein:
in the first mode, the first input of the color cache receives blended colors from the blender and the second input of the color cache receives input colors for blending from a memory fabric.

10. A graphics processing pipeline, comprising:
a pixel shader stage;
a memory system; and
a blender configured to:
in a first mode in which blending is enabled, reading in render target color data from the memory system,
blend the render target color data with one or more fragments received from the pixel shader stage to generate blended color data, and
output the blended color data to the memory system utilizing a first amount of bandwidth; and
a coarse fragment amplifier configured to:
in a second mode in which blending is disabled and variable rate shading is enabled, convert shaded coarse fragments received from the pixel shader stage into fine fragments, and
output the fine fragments to the memory system utilizing a second amount of bandwidth that is higher than the first amount of bandwidth.

11. The graphics processing pipeline of claim 10, wherein the memory system includes a color cache.

12. The graphics processing pipeline of claim 11, wherein outputting the blended color data to the memory system utilizing the first amount of bandwidth comprises:
outputting the blended color data to the color cache via a first communication channel between a first output of a blender and a first input of the color cache, wherein the first communication channel has the first amount of bandwidth.

13. The graphics processing pipeline of claim 12, wherein the color cache is further configured to:
output write-back data from the color cache to a memory fabric utilizing a second communication channel that has a third amount of bandwidth that is greater than the first amount of bandwidth.

14. The graphics processing pipeline of claim 13, wherein the second communication channel comprises:
a first communication sub-channel that includes a second output of the color cache and a third output of the color cache, wherein in the first mode, the second output of the color cache is utilized to provide the render target color data to the blender and in the first mode, the third output of the color cache is utilized to output write-back data.

15. The graphics processing pipeline of claim 14, wherein each of the second output and the third output has the first amount of bandwidth.

16. The graphics processing pipeline of claim 11, wherein the blender is further configured to output shaded coarse fragments to the coarse fragment amplifier via a first communication channel having the first amount of bandwidth.

17. The graphics processing pipeline of claim 16, wherein outputting the fine fragments to the memory system includes:
outputting the fine fragments to the color cache via a first communication sub-channel that includes a first output of the coarse fragment amplifier and a first input of the color cache and a second communication sub-channel that includes a second output of the coarse fragment amplifier and a second input of the color cache.

18. The graphics processing pipeline of claim of claim 17, wherein:
in the first mode, the first input of the color cache receives blended colors from the blender and the second input of the color cache receives input colors for blending from a memory fabric.

19. A computer system, comprising:
a graphics processing pipeline; and
a processor configured to transmit rendering instructions to the graphics processing pipeline,
wherein the graphics processing pipeline comprises:
a pixel shader stage;
a memory system; and
a blender configured to:
in a first mode in which blending is enabled, reading in render target color data from the memory system,
blend the render target color data with one or more fragments received from the pixel shader stage to generate blended color data, and
output the blended color data to the memory system utilizing a first amount of bandwidth; and
a coarse fragment amplifier configured to:
in a second mode in which blending is disabled and variable rate shading is enabled, convert shaded coarse fragments received from the pixel shader stage into fine fragments, and
output the fine fragments to the memory system utilizing a second amount of bandwidth that is higher than the first amount of bandwidth.

20. The computer system of claim 19, wherein the memory system includes a color cache.

* * * * *